US008976198B2

(12) United States Patent
Borders et al.

(10) Patent No.: US 8,976,198 B2
(45) Date of Patent: Mar. 10, 2015

(54) METHOD, SYSTEM AND COMPUTER PROGRAM PRODUCT FOR CREATING SHAPE COLLAGES

(75) Inventors: Kevin R. Borders, Silver Spring, MD (US); Joseph M. Golden, Ann Arbor, MI (US)

(73) Assignee: Collage.com, LLC, White Lake, MI (US)

( * ) Notice: Subject to any disclaimer, the term of this patent is extended or adjusted under 35 U.S.C. 154(b) by 597 days.

(21) Appl. No.: 12/909,452

(22) Filed: Oct. 21, 2010

(65) Prior Publication Data

US 2011/0096075 A1 Apr. 28, 2011

Related U.S. Application Data

(60) Provisional application No. 61/279,510, filed on Oct. 22, 2009.

(51) Int. Cl.
*G09G 5/00* (2006.01)
*G06F 17/00* (2006.01)
*G06F 3/048* (2013.01)
*G06K 9/36* (2006.01)
*G06T 11/60* (2006.01)

(52) U.S. Cl.
CPC ..................................... *G06T 11/60* (2013.01)
USPC ........... 345/634; 345/629; 715/243; 715/246; 715/247; 715/765; 715/788; 382/284

(58) Field of Classification Search
USPC .......... 345/629–641; 715/243–253, 764, 765, 715/769, 788, 799, 800; 382/284
See application file for complete search history.

(56) References Cited

U.S. PATENT DOCUMENTS

| | | | |
|---|---|---|---|
| 7,620,267 B2 | 11/2009 | Widdowson | |
| 2004/0160462 A1* | 8/2004 | Sheasby et al. | 345/788 |
| 2005/0044485 A1* | 2/2005 | Mondry et al. | 715/502 |
| 2007/0098266 A1* | 5/2007 | Chiu et al. | 382/224 |
| 2008/0075390 A1* | 3/2008 | Murai et al. | 382/284 |
| 2008/0123993 A1* | 5/2008 | Widdowson | 382/284 |
| 2008/0215985 A1* | 9/2008 | Batchelder et al. | 715/731 |
| 2010/0164986 A1 | 7/2010 | Wei et al. | |
| 2012/0147046 A1* | 6/2012 | Chao | 345/641 |

* cited by examiner

*Primary Examiner* — Wesner Sajous
*Assistant Examiner* — Andrew Shin
(74) *Attorney, Agent, or Firm* — Brooks Kushman P.C.

(57) ABSTRACT

A method, system and computer program product for creating shape collages are provided. The method includes receiving a shape specification signal which specifies at least one desired shape having an area. The method further includes receiving image data which represents a plurality of images. The method still further includes processing the shape specification signal and the image data to obtain a shape collage of the images at least partially covering the area of the at least one desired shape. The step of processing may include the steps of at least partially covering the at least one desired shape with at least one shape primitive and placing at least one image over the at least one shape primitive to at least partially fill the at least one shape primitive. The method may further include receiving a command signal to either locate a user-specified image essentially or approximately at a desired location in the shape collage or resize the user-specified image from an initial size in the initial collage to a desired size. The method may still further include processing the command signal and the shape collage to create a finished shape collage having either the user-specified image essentially or approximately at the desired location or the user-specified image with the desired size to increase visual appeal of the finished shape collage to the user.

27 Claims, 4 Drawing Sheets (a)

(b)

(a)  (b)

METHOD, SYSTEM AND COMPUTER PROGRAM PRODUCT FOR CREATING SHAPE COLLAGES

CROSS-REFERENCE TO RELATED APPLICATION

This application claims the benefit of U.S. provisional patent application No. 61/279,510 filed Oct. 22, 2009.

BACKGROUND OF THE INVENTION

1. Field of the Invention

This invention relates to methods, systems and computer program products for creating shape collages.

2. Background Art

The process of creating a shape collage can be complicated and time-consuming. Creating a shape collage by hand requires one to be skilled in the field of photo editing, and expend a decent amount of manual effort.

Many have recognized the value of automating collage creation, and have made computer programs that create collages automatically on the user's behalf. For example, Snapfish.com provides collage creation software on their website that allows users to build rectangular collages. The program used by Snapfish.com will take a plurality of rectangular images, along with their sizes, and arrange them to fit inside of a rectangular area. The Snapfish.com program resizes the rectangular images and arranges them in such a way that the border between images is the same size throughout the entire collage. The resulting collage is precisely rectangular in shape. Snapfish.com discloses a method and computer program for creating rectangular shape collages that consists solely of image splitting operations. In the Snapfish.com algorithm, images are added one-by one to the collage by inserting each new image next to a current image, splitting the image, and then adjusting all the other images so their shape is still a rectangle with even borders that fits within the collage area. The Snapfish.com algorithm tests multiple locations (top, bottom, left, right) and multiple images to split when adding each new image. It computes a metric based on how close the resulting rectangle's aspect ratio is to that of the collage, as well as the distribution of image sizes (images should have similar sizes, instead of one big and many small images). It then uses this metric to determine the best splitting location for each new image. The Snapfish.com algorithm and computer program only support rectangle shapes and not non-rectangular shapes. The Snapfish.com program is further unable to create collages with more than 30 images due to its inefficient approach to arranging images.

Shapecollage.com provides a computer program to automatically construct shape collages. The Shapecollage.com program employs a machine learning algorithm for iteratively adjusting image placement so that images will fit into any arbitrary shape. The algorithm tries to minimize overlap between images and minimize the amount of uncovered space inside of the collage shape. Unlike the Snapfish.com program, the Shapecollage.com program is efficient and can produce collages with thousands of images in a reasonable amount of time.

The Shapecollage.com program is somewhat undesirable because it cannot arrange images so that no images overlap and the images have even borders between them, like the Snapfish.com program. The Shapecollage.com program will start by placing images randomly in a working area, and then move all of the images inside of the desired shape. Then, it will iteratively pass over each image and adjust its placement based on nearby images. If an image can be moved to produce a more desirable covering of the shape (less overlap with other images and less empty space), then it will be moved accordingly at each step. After this algorithm is applied for several iterations, images will settle in their final places, and the Shapecollage.com program will produce a final collage image. The approach of iteratively adjusting photo placements solely using a metric based on nearby photos precludes creation of a more desirable collage that has even borders between all images and in which no images overlap.

Zumyn.com provides a computer program for creating photo mosaics. The photo mosaics created by the Zumyn.com software differ from shape collages. The mosaics are rectangular and are filled with images that are all the same size (those that are a different aspect ratio must be cropped) and have no border. Instead of arranging the photos so that their locations conform to a shape, the Zumyn.com software arranges the photos so that their colors match the color of a background image.

Picture2life.com allows users to create a collage in the shape of various countries. It appears that this site was created in 2010. The picture2life.com software creates collages in the shape of countries without any gaps or overlapping between the images. However, it will crop images so that they will all fit into rectangles of a fixed size and aspect ratio. Cropping to a fixed aspect ratio is undesirable because important parts of pictures may be cut off, especially if some are portraits and some are landscapes. It also appears that picture2life.com has a fixed number of positions (e.g. 16) for pictures in their country collages. If one has fewer than the number of slots, images will be duplicated, and if one has more, only the first N (e.g. 16) will be used. Picture2life.com does not use a dynamic method for creating shape collages, so one is limited to a fixed number of images with a fixed size and aspect ratio for each one. Most other collage generation technologies use a similar method. Having fixed positions for each of the images is undesirable because one has at least one of: gaps, overlapping, or cropping, all of which are undesirable and have a negative impact of the collage's visual appeal. Also, fixing image positions limits the number of images one can have in a collage, which is undesirable as well because people have photo albums of different sizes.

U.S. Pat. No. 7,620,267 and published U.S. patent application 2010/0164986 are related to the present invention.

SUMMARY OF THE INVENTION

An object of at least one embodiment of the invention is to provide a method, system and computer program product for creating shape collages wherein collages in any arbitrary shape or collection of shapes can be created, and can produce collages with many hundreds if not thousands of images because the method, system and computer program product employ an efficient approach to determining image placement.

Another object of at least one embodiment of the invention is to provide a method, system and computer program product for creating shape collages which allow a user to move and/or resize images such as photographic images in the shape collage. Allowing placement of photos in specific locations is a desirable feature, because someone using at least one embodiment of the invention can place their favorite images in more prominent locations, or arrange images in any other manner to increase visual appeal. Allowing users of at least one embodiment of the invention to resize images provides further options for making a more desirable collage.

At least one embodiment of the invention provides a method, system and computer program product for automatically creating a shape collage and which allows a user to place or resize one or more images inside of the collage.

Still another object of at least one embodiment of the present invention is to provide a method, system and computer program product for dynamically generating shape collages without overlapping, gaps or cropping of images wherein an arbitrary number of images are supported.

In carrying out the above objects and other objects of the present invention, a computer-implemented method of creating a shape collage is provided. The method includes receiving a shape specification signal which specifies at least one desired shape having an area. The method further includes receiving image data which represents a plurality of images. The method still further includes processing the shape specification signal and the image data to obtain a shape collage of the images at least partially covering the area of the at least one desired shape.

The method may further includes receiving a command signal to locate a user-specified image essentially or approximately at a desired location in the initial shape collage. The method may still further include processing the command signal and the shape collage to create a shape collage having the user-specified image essentially or approximately at the desired location to increase visual appeal of the shape collage to the user.

The user-specified image may have an initial location in the initial shape collage and the step of processing may relocate the user-specified image from the initial location in the initial shape collage.

The method may include receiving a command signal to resize the user-specified image from an initial size in the initial collage to a desired size and the step of processing may include the step of processing the command signal and the user-specified image to create the finished shape collage having the user-specified image with the desired size to increase visual appeal of the finished shape collage to the user.

The images may be photographic images.

The step of processing may include the steps of at least partially covering the at least one desired shape with at least one shape primitive and placing at least one image over the at least one shape primitive to at least partially fill the at least one shape primitive.

The step of placing may include the step of adding at least one image that spans multiple shape primitives.

A plurality of shape primitives may at least partially cover the at least one shape and the shape primitives may be rectangular shape primitives.

The at least one desired shape may be non-rectangular.

The images in the finished shape collage may be non-overlapping.

Borders between adjacent images in the finished shape collage may be substantially the same.

The area of the at least one desired shape may be fully covered with the images.

The step of processing may include the step of cropping any images that are positioned outside the at least one desired shape to achieve a more visually defined outline of the at least one desired shape.

The shape specification signal may specify a plurality of desired shapes.

Further in carrying out the above objects and other objects of the present invention, a system for creating a shape collage is provided. The system includes means for receiving a shape specification signal which specifies at least one desired shape having an area. The system further includes means for receiving image data which represents a plurality of images. The system still further includes a processor for processing the shape specification signal and the image data to obtain a shape collage of the images at least partially covering the area of the at least one desired shape.

The system may further include means for receiving a command signal to locate a user-specified image essentially or approximately at a desired location in the shape collage. The processor may finally process the command signal and the shape collage to create a shape collage having the user-specified image essentially or approximately at the desired location to increase visual appeal of the shape collage to the user.

The user-specified image may have an initial location in the initial shape collage and the processor may relocate the user-specified image from the initial location in the initial shape collage.

The system may include means for receiving a command signal to resize the user-specified image from an initial size in the initial collage to a desired size and the processor may process the command signal and the user-specified image to create the finished shape collage having the user-specified image with the desired size to increase visual appeal of the finished shape collage to the user.

The processor may at least partially cover the at least one desired shape with at least one shape primitive and may place at least one image over the at least one shape primitive to at least partially fill the at least one shape primitive.

The processor may add at least one image that spans multiple shape primitives.

The processor may crop any images that are positioned outside the at least one desired shape to achieve a more visually defined outline of the at least one desired shape.

Still further in carrying out the above objects and other objects of the present invention, a computer-readable non-transitory storage medium is provided. The medium stores a set of instructions including instructions which, when executed by one or more processors, cause the one or more processors to perform the steps of: receiving a shape specification signal which specifies at least one desired shape having an area; receiving image data which represents a plurality of images; and processing the shape specification signal and the image data to obtain a shape collage of the images at least partially covering the area of the at least one desired shape.

The instructions may include instructions which cause the one or more processors to perform the steps of: receiving a command signal to locate a user-specified image essentially or approximately at a desired location in the initial shape collage; and processing the command signal and the shape collage to create a shape collage having the user-specified image essentially or approximately at the desired location to increase visual appeal of the shape collage to the user.

The user-specified image may have an initial location in the initial shape collage and the step of processing may relocate the user-specified image from the initial location in the initial shape collage.

The one or more processors may perform the step of receiving a command signal to resize the user-specified image from an initial size in the initial collage to a desired size and the step of processing may include the step of processing the command signal and the user-specified image to create the shape collage having the user-specified image with the desired size to increase visual appeal of the shape collage to the user.

The step of processing may include the steps of at least partially covering the at least one desired shape with the at least one shape primitive and placing at least one image over the at least one shape primitive to at least partially fill the at least one shape primitive.

The step of placing may include the step of adding at least one image that spans multiple shape primitives.

The step of processing may include the step of cropping any images that are positioned outside the at least one desired shape to achieve a more visually defined outline of the at least one desired shape.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3(a) is a view of one possible covering of a heart shape with horizontal rectangular shape primitives;

DETAILED DESCRIPTION OF THE PREFERRED EMBODIMENTS

Shape Collage Creation Architecture

Shape Specification

Figure 2:
FIG. 2 is a view of a finished shape collage in the shape of the word "LOVE"

At least one embodiment of the invention described herein requires a shape specification as an input for creating a shape collage. In at least one embodiment of the invention, the shape specification defines one or more outlines for the shape in which images are placed. FIG. 2 shows a shape collage with four different outlines, one for each letter of the word "LOVE" Each outline consists of three or more points that define the outline. For example, a square outline would have four points at the four corners of the square. The outline point list may be in any two-dimensional coordinate system, and the coordinate values may be relative to an origin at any point. One of ordinary skill in the field will appreciate that there are many ways to specify a shape, and that other methods could provide the same shape specification capabilities. The manner in which shapes are specified is not critical to the proper functioning of the invention.

Shape Covering

After a shape has been specified as an input to a computer system programmed with the computer program product (the program also has a list of at least image aspect ratios, but possibly image dimensions and image identifiers), the next step is for the program to fully or partially cover the specified shape with one or more shape primitives. In at least one embodiment of this invention, the shape primitives can be rectangles. One of ordinary skill in the field would understand that shape primitives other than rectangles, and different combinations of different types of shape primitives, may also be used to cover the shape(s) in the shape specification. The shape primitives are not named "primitive" because they must be simple shapes, but only because they may be combined to cover the shape(s) in the shape specification. The shape primitives could be arbitrarily complex outlines or sets of outlines, with possibly one shape primitive covering the entire shape specification.

Figure 3:
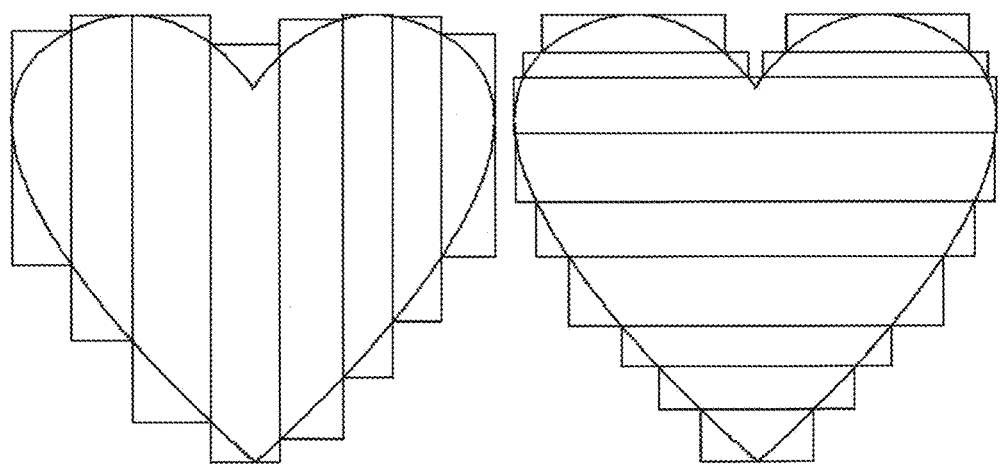
FIG. 3(a) is a view of one possible covering of a heart shape with vertical rectangular shape primitives.

One embodiment of the invention can automatically cover the shape specification. In the case where rectangles are being used for shape primitives and the shape specification contains a list of outlines, each outline may be covered automatically by placing one or more rectangles across each outline, covering the outline more precisely the larger the number of rectangles. FIG. 3a demonstrates this outline covering using eight vertical rectangles to cover a heart shape. In the case where vertical rectangles are being used, the rectangle widths may be chosen so that every rectangle covering the shape is the same width, or they may be determined randomly so that different rectangles have different widths. Randomizing the widths can lead to a more visually appealing result. The size and number of shape primitives to use for covering a shape is related to the number of total images in a shape collage. If there are a large number of images, then it is better to use more numerous and smaller shape primitives because most of the images will be resized to fit within one shape primitive.

Continuing with the example of vertical lines, each line's top and bottom values may be selected so that the shape primitives, when combined, fully cover the outline from the shape specification. Another option is setting the top and bottom of each rectangle so that it is fully within the outline. If horizontal rectangles are being used, as shown in FIG. 3b, then the same process can take place, switching widths with heights and the top and bottom values with the left and right values. Other embodiments of the invention could leave spaces in between shape primitives, overlap shape primitives, or use other strategies for covering the shape specification.

The shape specification may also be covered ahead of time by hand. One of ordinary skill in the field could imagine the provider of at least one embodiment of the invention defining shape primitive covering strategies for particular shape specifications ahead of time. The ability to automatically determine such coverings is an additional feature that reduces the burden on the user or provider of the at least one embodiment of the invention.

Filling Shape Primitives

Standard Filling

Once one or more shape primitives are available that provide a partial or full covering of the shape specification, individual images can begin to be placed so that they will partially or fully cover the shape primitives. In an embodiment of the invention where the shape primitives fully cover the shape, and images fully cover the shape primitives, the shape area(s) in the shape collage will be fully covered with no empty space (with the possible exception of borders or padding between images), which is a desirable feature of shape collages. In another embodiment of the invention where the shape primitives are fully within the shape specification and images are fully within the shape primitives, no images will be outside of the shape(s) in the shape collage, and thus no images will be cropped by a mask that removes parts of images outside of the shape.

One strategy for filling rectangular shape primitives with rectangular images is to resize each image to have the same width or height as the width or height of the shape primitive. Then, the image can be inserted into the shape primitive either so that it fully covers the primitive, and potentially extends beyond the end of the primitive, or so that the image only partially covers the shape primitive, and there is potentially room for more images.

Figure 4:
FIG. 4 is a view of a single thin rectangular shape primitive (the black outline) as it is being filled with multiple images.

In the case of shape primitives that are narrow rectangles and images that have standard aspect ratios, many images may be inserted into a single shape primitive. This is illustrated in FIG. 4. Images may be added so that they are fully contained by the shape primitive, or images may be added until they fully cover the shape primitive, possibly extending beyond the bounds of the shape primitive. If images extend beyond the shape primitive, they may be cropped, or just left in place. In the case where a shape mask is applied, images close to the borders of the outlines in the original shape specification may be fully or partially covered by the mask.

When filling shape primitives, regardless of the size or location of images, a border may be added to any of the images when inserting the image. This has no affect on the actual placement algorithm, because an image with a border is just treated as a slightly larger image. It is possible to add images that line up exactly next to one another and have no border or overlap, or to add images of arbitrary border width.

Spanning Multiple Shape Primitives

As images are added to shape primitives, it may be desirable to have one image span multiple shape primitives. In an embodiment of the invention where many thin adjacent rectangular shape primitives are used, having some images span multiple columns gives the collage more of a "random" or "natural" look, which is desirable compared to a grid-like appearance. One way to allow for images to span multiple shape primitives is place an image in multiple shape primitives and then fix that spanning image's location in both primitives. If another image is inserted into a shape primitive containing the spanning image, then it should not move the spanning image. Or, if the spanning image is allowed to move, then other images in the shape primitives must also move accordingly if the desired shape collage is to have no overlapping images.

Figure 5:
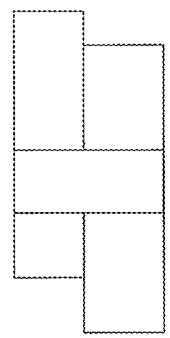
FIG. 5 is a view which shows how one can add an image that spans multiple shape primitives and displaces those shape primitives.

Another way to have an image effectively span multiple shape primitives is to break up the shape primitives and insert a new shape primitive containing the spanning image. This is shown in FIG. 5. If the goal is to produce a collage with no overlapping images and even borders between all of the images, then it is important to only produce rectangular shape primitives in this manner that are precisely the aspect ratio of an input image, or group of input images. The exception is if rectangular shape primitives have one or more ends that is/are adjacent to the edge of a shape. In this case, images of any aspect ratio can be placed into the shape primitive, and they may overflow outside of the shape without overlapping or preventing full coverage.

Splitting Images

Any two rectangles can be positioned next to each other on one of their four sides, and then have their heights (if it is the left or right side) or widths (if it is the top or bottom) adjusted to be the same. At this point, if adjacent edges of the two rectangles are fixed together, the two rectangles can be treated as a unified rectangle that has a different aspect ratio. In this way, it is possible to split the space that an image occupies by placing another image adjacent to it, and then shrinking both of the images so that they either have the same height (if placed above or below) or the same width (if placed left or right) as the original single image. At any point while filling shape primitives with images, an image may be split into two by adding an image adjacent to it and shrinking the images, instead of inserting the new image to cover more area within the shape primitives.

Dynamically Adjusting Shape Primitives

If rectangular shape primitives are being used, as well as rectangular input images, then it may be possible to have images precisely fit within the shape primitives (not overflowing and no space remaining) by adjusting the aspect ratio of the shape primitives. If a rectangular shape primitive has only a small amount of space remaining, it can be made more square by widening the narrow dimension, and all images contained therein can be expanded to precisely cover the shape primitive. Similarly, if images are barely overflowing, a rectangular shape primitive could be made narrower and the images could be reduced to precisely fit the shape primitive.

After a shape primitive is resized, it may also be repositioned. Other shape primitives in the shape collage may also be moved or repositioned to compensate for the adjustment. This can help ensure that a shape is still fully covered with no overlapping and no gaps after a shape primitive is moved or resized.

During the process of filling shape primitives with images, it may be that case that all of the shape primitives are full and more input images remain, or that the primitives are not full and all of the input images have been used. If there are too many images, then there are a few options inserting additional images (assuming that it is undesirable to omit selected images from the shape collage.) One option is to continuously split images as described in the above section entitled "Splitting Images". If an image is split, then two images will fit in its place, and it will actually become smaller, making room for more images. Another option is to shrink all of the current shape primitives and one or more new shape primitives to the shape collage. These primitives can then be filled up with the additional images. This process can be repeated until all images are used. Finally, all shape primitives and images can be removed, the shape primitives can be re-positioned to cover the shape (possibly using more primitives to make room for more images), and the images can be placed into the shape primitives again.

If all of the input images have been used, and there is still remaining space in one or more shape primitives that would be desirable to cover with more images according to the filling strategy (e.g., no empty space and no overlapping), then there are a few options for covering the remaining space. One option is to repeatedly add input images that have already been placed once until the remaining space is filled. This may be a reasonable strategy in some cases. If it is not, then another option is un-splitting images that have been split previously, and adding the removed image to the empty space. This can be combined with a strategy of taking images that only fit in one shape primitive, and instead have them expanded to cover multiple shape primitives, as mentioned herein in the section "Spanning Multiple Shape Primitives". Finally, shape primitives may be expanded so their images take up more space, and primitives may be removed and have their images added to cover space in other shape primitives.

Supporting Specific Image Placement

Figure 1:
FIG. 1(a) is a view of a finished shape collage that has been created automatically in the shape of a heart.
FIG. 1(b) is a view of a finished shape collage in the shape of a heart that has had some images placed manually or semi-automatically.

One key feature of at least one embodiment of the invention described herein is that it contains an additional mechanism whereby a user can resize or place specific images after a shape collage has already been created. This is a highly desirable feature, as users may want to move specific favorite images to a more prominent location, or arrange particular images in such a way as to increase visual appeal. FIG. 1a shows a shape collage that does not have any such placed images. FIG. 1b shows the result of creating a shape collage with the same pictures, but placing particular ones in prominent locations.

Any specific image placement happens after the entire shape collage has been created as specified herein in the section "Shape Collage Creation Architecture". In addition to the shape and image inputs listed in that section, the specific image placement stage requires a list of image placement IDs from the original output, along with new locations for the images (these can be specified relative to any origin point in a two-dimensional space), and their new heights or widths (both height and width must be given if the aspect ratio of the image is to change). Image placement is a two-step process that consists of removing the placed image from its old location (this step can be omitted if the desired operation is to copy the image), and then adding the image to its new location. These two steps are described in the following subsections, along with a section on cleaning up the collage after the placement process. The process of placing a specific image in a shape collage may be repeated many times to place many different images.

Removing a Shape Collage Image

The first step in removing an image from a shape collage is to simply remove it from the position it occupied in its original shape primitive. This is fairly straightforward for shape primitives that have an open end (i.e. it is not totally surrounded by other shape primitives on other sides). In this case, the image can be removed, and others can be inserted in its place. If there are not enough images, the same approach described herein in the section "Dynamically Adjusting Shape Primitives" can be taken to fill the remaining space. If the image spans multiple open-ended shape primitives (as described herein in the section "Spanning Multiple Shape Primitives"), then it can be removed from each of them in the same way.

If a shape primitive is surrounded by other shape primitives on all sides (this is called a "fixed" shape primitive), then disrupting its aspect ratio without adjusting adjacent shape primitives could potentially cause overlapping or leave gaps in coverage. Removing an image from a shape primitive without having one of the same aspect ratio to replace it will lead to such an aspect ratio change. One solution to this problem is to destroy the fixed shape primitive entirely, and then expand other surrounding shape primitives to cover the area previously occupied by the fixed shape primitive. In this case, any remaining images in the fixed shape primitive at the time of destruction would be added to the shape primitives that expand to take its place.

A second option for removing an image from a fixed shape primitive is to adjust the aspect ratio of the fixed shape primitive, adjust its size and placement if necessary, and then adjust the surrounding shape primitives as well so that the shape collage still does not have any overlapping images or gaps. Of course, if overlapping, cropping, or gaps are allowed, then the remaining images in the shape primitive could be expanded and cropped, or left at their aspect ratio and expanded to create overlapping, or left the same size to allow gaps. However, this may detract from the visual appeal of the shape collage.

Inserting an Image into a Shape Collage

Allowing an image to be placed at any arbitrary location and with any arbitrary size inside of an existing shape collage, and then moving other images out of the way so that nothing overlaps and there are even borders, is a challenging task. Furthermore, performing this placement with a minimal impact on the location of existing images is even more difficult. It potentially involves resizing, moving, deleting, and inserting shape primitives before inserting the actual image. This task is further complicated by the existence of shape primitives that have adjacent shape primitives on all sides and images that span multiple shape primitives.

This section breaks down the task of inserting an image into logical steps. The description and ordering of steps presented in this section is one possible approach to placing an image. One of ordinary skill in the field can appreciate that there are other ways to insert images, and some of the steps described in this section may be re-ordered or skipped in some situations.

Aligning Existing Shape Primitives

When an image is placed in an arbitrary location or resized to be an arbitrary size, it is bound to partially overlap some shape primitives. This means that it may be partially overlapping some existing images, which is an undesirable property of shape collages. The first step in making space for a newly inserted image is moving, and possibly resizing, overlapping shape primitives.

Figure 6:
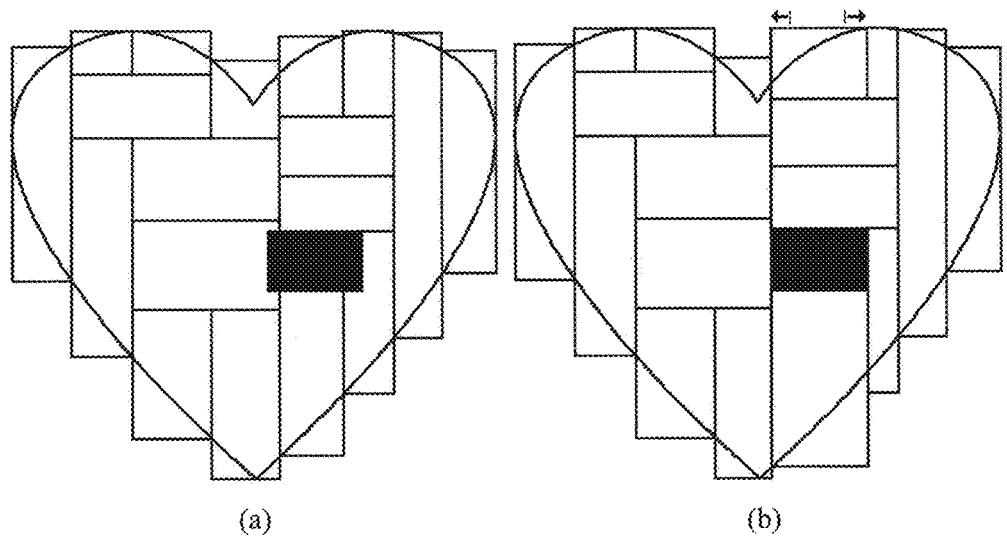
FIG. 6(a) is a view of an image being placed (the black box) into a shape collage.
FIG. 6(b) is a view which shows how shape primitive left and right values may be adjusted to align with the edges of the newly placed image.

In an embodiment of the invention where long, thin rectangular shape primitives are used to cover the collage, the alignment step involves moving the rectangular shape primitives so that the left and right side of the inserted image (for vertical rectangles—top and bottom for horizontal rectangles) line up exactly with existing shape primitives. FIG. 6a shows the position of a newly inserted image in a shape collage, and FIG. 6b shows how other shape primitives can be moved for the initial alignment step. No left or right positions of shape primitives will have to be moved after this first step.

When the left and right positions of shape primitives are moved, it may be necessary to shrink or enlarge images that are inside of the shape primitives. If the shape primitive no longer has space for all of its images, then those that do not fit can be removed and re-added at cleanup time. Similarly, if a shape primitive is no longer fully covered, then additional images can be added to it at cleanup.

In addition to adjusting the edges of shape primitives that overlap the placed image, it may also be desirable to adjust the widths of other non-adjacent shape primitives to balance the change in shape primitive widths. If this balancing step is not taken, then the shape primitives tend to become unbalanced (i.e., some will be very narrow, and others will be much wider), which has a negative impact on the visual appeal of the collage.

During this adjustment step, it may also be desirable to create new shape primitives. This may occur in the case where an image is placed very close to the left or right edge of a shape (for vertical rectangles—top and bottom for horizontal rectangles). To make the left or right side of the inserted image line up with other shape primitives, a narrow shape primitive between the left or right side and the edge of the shape would be necessary. If the shape primitive already at the edge of the collage were to be made much thinner, then the images inside of that shape primitive would be moved and resized significantly from their current position. This is undesirable, as one wants to keep as many of the images as one can as close as possible to their original locations and sizes.

Moving Fixed Shape Primitives and Spanning Images

When an image is inserted into a shape primitive, it must push other images out of the way to avoid overlapping. This is straightforward for an open-ended shape primitive (one where at least one of the edges is adjacent to the edge of the shape and not any other shape primitives), but can be complicated for a fixed shape primitive (one with surrounding shape primitives on all sides). The first step in correctly making space for a new image is finding all of the fixed shape primitives above and below the newly placed image (or left and right if horizontal rectangular shape primitives are being used), as well as any images that are spanning multiple columns, which can be thought of logically as existing in their own fixed shape primitive that has one image.

Figure 7:
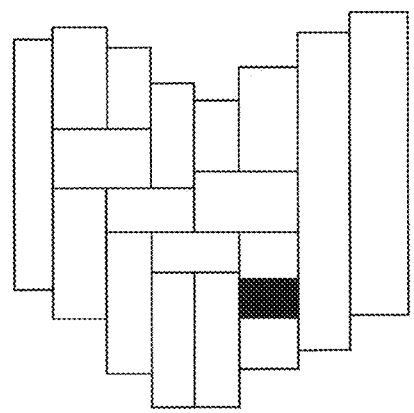
FIG. 7 is a view which demonstrates a scenario where a placed image can iteratively affect the position of fixed shape primitives in multiple adjacent columns.

This initial step of just finding related shape primitives that may need to be moved is not as simple as it may seem. In addition to all shape primitives that overlap the same columns or rows as the placed image, the computer system programmed with the computer program must iteratively find fixed shape primitives in columns or rows into which the fixed shape primitives extend. In the worst case, inserting an image into one shape primitive could affect image placement in the entire shape. FIG. 7 demonstrates a situation where iterative searching for fixed shape primitives is necessary. The new image, represented by a black rectangle, is placed in the sixth column, but moving the fixed shape primitive above it would also iteratively affect shape primitives in columns two through five.

The result of the initial fixed shape primitive searching step will be a list of fixed shape primitives that may need to be moved to make room for the newly placed image. The next step is identifying fixed shape primitives in this list that are in the same columns (or rows) as the placed image. For each of these fixed shape primitives, the program must then determine whether it is or will be above or below the newly placed image. Fixed shape primitives that overlap the new image may be moved either above or below the new image. Primitives that are totally above or below the new image should remain above or below, respectively.

Figure 8:
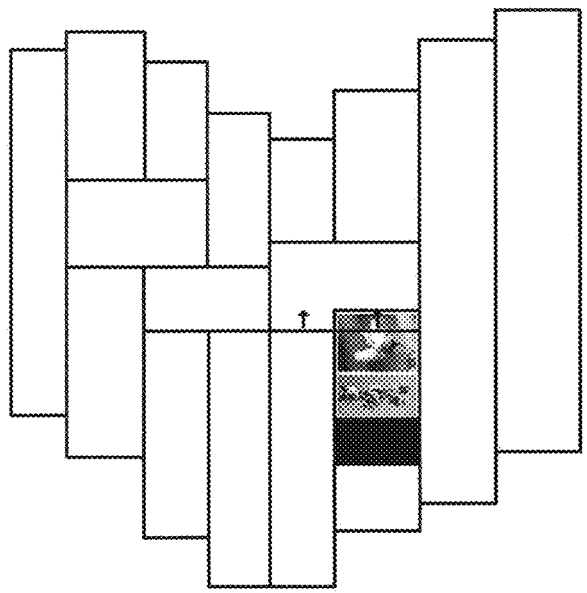
FIG. 8 is a view which illustrates a scenario where a fixed shape primitive that is above the placed image (the black box) has to be moved because available images do not fit precisely between it and the placed image.

Once the determination is made whether each fixed shape primitive in the same columns (or rows) as the new image should be above or below the new image, it is time to actually move the shape primitives, column by column. If there is some space between the fixed shape primitive and the new image, then the primitive, and all primitives iteratively adjacent to it, need to be moved in such a way that the new gap between the primitive and the new image can precisely hold zero or more other images without any gaps or overlapping. Essentially, a fixed shape primitive must exist or be created between the new image and the existing shape primitive using images that are at or near the same location. However, the aspect ratios of available images may not allow creation of a new fixed shape primitive that precisely occupies the space between the existing shape primitive and the new image. In this case, the existing shape primitive may need to be moved up or down to line up with the height of the new in-between shape primitive. FIG. 8 illustrates this situation. Two images are added in between the placed image (shown as a black box) and the existing fixed shape primitive. However, these images slightly overlap the fixed shape primitive, so it must be moved upwards.

Figure 9:
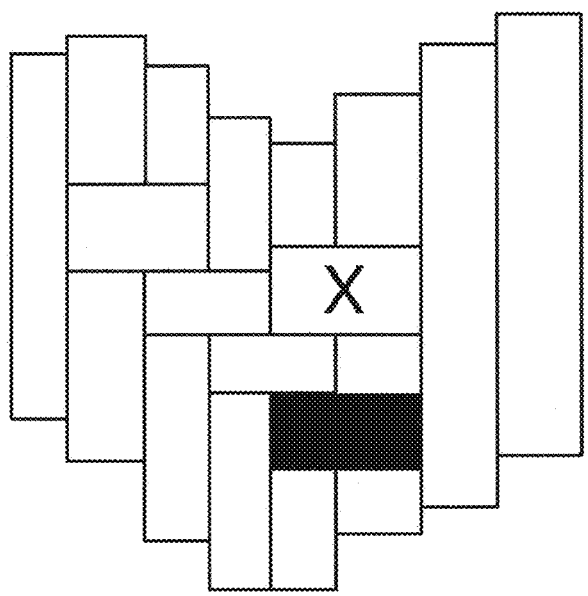
FIG. 9 is a view which shows a scenario where a fixed shape primitive has to be broken up because there is no way to fill the space between it and the placed image without causing overlapping or uneven gaps.

When iterating over all the columns (or rows) that the newly insert image occupies to move shape primitives, it may happen that the program wants to move a shape primitive that has already been aligned as a result of being in a previous column, or being adjacent to a primitive in a previous column. In this situation, it may be impossible to correctly fill the space in between this fixed shape primitive and the new image, because moving it again may cause it to overlap with images in previous columns. FIG. 9 shows a situation where this may occur. When this happens, one approach is to remove the image(s) from the fixed shape primitive, remove the primitive from the collage, extend non-fixed shape primitives to cover its area, and then re-add the image(s) to the non-fixed shape primitives so they stay in approximately the same location. In FIG. 9, the fixed shape primitive that will be removed is marked with an X.

After iterating over all the columns that the newly placed image occupies and aligning fixed shape primitives in those columns, it will no longer be necessary to move any fixed shape primitives to make room for the newly placed image.

Inserting the Placed Image

Following the steps described in the previous two sections, no more shape primitives need to be moved, except those directly overlapping the placed image. The final steps are the following:

1. Create a new fixed shape primitive that is exactly the size and position of the newly placed image.
2. Displace any existing shape primitives that overlap the new shape primitive.
3. Add the new shape primitive to the collage.
4. Add the placed image to the shape primitive.

The only step that is not self-explanatory here is displacing overlapping shape primitives.

If the placed image overlaps the middle of shape primitive that is open on both ends, then that shape primitive should be split up into two shape primitives that are adjacent to the placed image and each open on one end. If the placed image overlaps the fixed end of a shape primitive that is open on one end (it should align precisely with the fixed end because of the previous steps), then that fixed end can be moved so that it is adjacent to the placed image, but no longer overlapping. Finally, in the case where the placed image entirely covers an existing shape primitive, that existing shape primitive should be removed, and its images should be re-added to the collage.

Cleaning Up

After an image has been removed from the shape collage and put in a specific place, some cleanup may be required to fill in any spaces that are no longer fully covered with images, or to re-add images that have been removed from the collage. A similar process to that described herein in the section "Filling Shape Primitives" can be used to add images to the collage until no gaps remain. Images that have been removed from the collage during the image placement process should be added to cover gaps before any duplicate images are used.

If there are still images that were removed from the collage during the placement process, and they have not been added after the gap-filling part of the cleanup, then they should be re-added to the collage, if possible, using the procedures described in the section "Dynamically Adjusting Shape Primitives". The only time it is not possible to re-insert all of the removed images is when the entire shape has been covered with fewer placed images than were originally present in the collage.

After the cleanup process is complete, the new image will be in the specified location, no images will overlap, and all the borders between images will be the same, and there will be no gaps, thus maximizing the visual appeal of the collage.

Shape collages are visually appealing, whether viewed in digital form on a display of a computer system, printed on paper, knit into fabric, or displayed on other objects. Images can be printed on almost any type of object and a shape collage image can be transferred onto any type of object.

Hardware Overview

Figure 10:
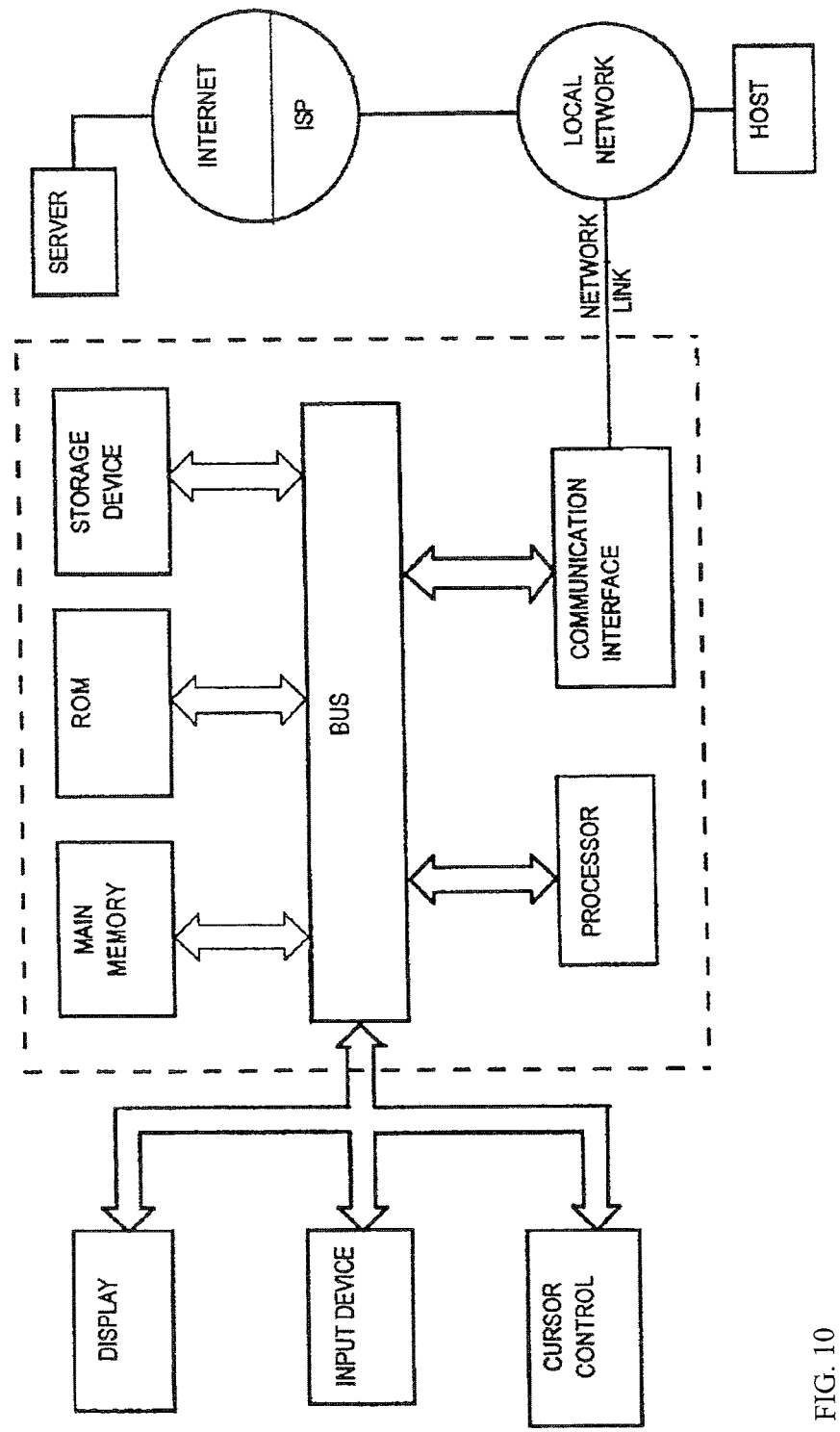
FIG. 10 is a block diagram of a computer system upon which embodiments of the invention may be implemented.

FIG. 10 is a block diagram that illustrates a computer system upon which an embodiment of the invention may be implemented. The computer system includes a bus or other communication mechanism for communicating information, and a processor coupled with bus for processing information. The computer system also includes a main memory, such as a random access memory (RAM) or other dynamic storage device, coupled to bus for storing information and instructions to be executed by processor. Main memory also may be used for storing temporary variables or other intermediate information during execution of instructions to be executed by processor. The computer system further includes a read only memory (ROM) or other static storage device coupled to bus for storing static information and instructions for processor. A storage device, such as a magnetic disk or optical disk, is provided and coupled to bus for storing information and instructions.

The computer system may be coupled via bus to a display, such as a cathode ray tube (CRT), for displaying information to a computer user. An input device, including alphanumeric and other keys, is coupled to the bus for communicating information and command selections to processor. Another type of user input device is cursor control, such as a mouse, a trackball, or cursor direction keys for communicating direction information and command selections to processor and for controlling cursor movement on display. This input device typically has two degrees of freedom in two axes, a first axis (e.g., x) and a second axis (e.g., y), that allows the device to specify positions in a plane.

At least one embodiment of the invention is related to the use of a computer system for implementing the techniques described herein. According to one embodiment of the invention, those techniques are performed by the computer system in response to a processor executing one or more sequences of one or more instructions contained in main memory. Such instructions may be read into main memory from another computer-readable medium, such as a storage device. Execution of the sequences of instructions contained in main memory causes the processor to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using the computer system, various computer-readable media are involved, for example, in providing instructions to the processor for execution. Such a medium may take many forms, including but not limited to storage media and transmission media. Storage media includes both non-volatile media and volatile media. Non-volatile media includes, for example, optical or magnetic disks. Volatile media includes dynamic memory, such as main memory. Transmission media includes coaxial cables, copper wire and fiber optics, including the wires that comprise a bus. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector can receive the data carried in the infra-red signal and appropriate circuitry can place the data on the bus. The bus carries the data to main memory, from which processor retrieves and executes the instructions. The instructions received by main memory may optionally be stored on the storage device either before or after execution by the processor.

The computer system also typically includes a communication interface coupled to bus. The communication interface provides a two-way data communication coupling to a network link that is connected to a local network. For example, communication interface may be an integrated services digital network (ISDN) card or a modem to provide a data communication connection to a corresponding type of telephone line. As another example, communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

A network link typically provides data communication through one or more networks to other data devices. For example, the network link may provide a connection through local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

Computer system can send messages and receive data, including program code, through the network(s), the network link and the communication interface. In the Internet example, a server might transmit a requested code for an application program through the Internet, ISP, local network and communication interface.

The received code may be executed by processor as it is received, and/or stored in storage device, or other non-volatile storage for later execution. In this manner, the computer system may obtain application code in the form of a carrier wave.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer-implemented method of creating a shape collage, the method comprising:
receiving a shape specification signal which specifies at least one desired non-rectangular shape having a shape area and a shape outline;
receiving image data which represents a plurality of images; and
processing the shape specification signal and the image data to obtain a shape collage of the images at least partially covering the shape area of the at least one desired shape, wherein the step of processing includes the steps of creating a covering based on the shape specification signal, the covering including a plurality of shape primitives, each of the shape primitives having a position which is specified so that it automatically covers a portion of the shape area according to a chosen covering option without the need for human input or intervention, the chosen covering option being one of:
(1) completely covering the shape area and minimizing area covered outside the shape outline;
(2) partially covering the shape area and area outside the shape outline; and
(3) maximizing coverage of the shape area without covering any area outside of the shape outline; and
placing at least one image over the shape primitives to at least partially fill each of the shape primitives.

2. The method as claimed in claim 1, wherein the step of placing includes the step of adding at least one image that spans multiple shape primitives.

3. The method as claimed in claim 1, wherein a plurality of shape primitives at least partially cover the at least one shape and wherein the shape primitives are rectangular shape primitives.

4. The method as claimed in claim 1, wherein the images in the shape collage are non-overlapping.

5. The method as claimed in claim 1, wherein borders between adjacent images in the shape collage are substantially the same.

6. The method as claimed in claim 1, wherein the area of the at least one desired shape is fully covered with the images.

7. The method as claimed in claim 1, wherein the step of processing includes the step of cropping any images that are positioned outside the at least one desired shape to achieve a more visually defined outline of the at least one desired shape.

8. The method as claimed in claim 1, wherein the images are photographic images.

9. The method as claimed in claim 1, wherein the shape specification signal specifies a plurality of desired shapes.

10. A computer-implemented method of creating a shape collage, the method comprising:
receiving a shape specification signal which specifies at least one desired non-rectangular shape having a shape area and a shape outline;
receiving image data which represents a plurality of images;
initially processing the shape specification signal and the image data to obtain an initial shape collage of the images at least partially covering the area of the at least one desired shape wherein the step of initially processing includes the steps of creating a covering based on the shape specification signal, the covering including a plurality of shape primitives, each of the shape primitives having a position which is specified so that it automatically covers a portion of the shape area according to a chosen covering option without the need for human input or intervention, the chosen covering option being one of:
(1) completely covering the shape area and minimizing area covered outside the shape outline;
(2) partially covering the shape area and area outside the shape outline; and
(3) maximizing coverage of the shape area without covering any area outside of the shape outline; and
placing at least one image over the shape primitives to at least partially fill each of the shape primitives;
receiving a command signal to either locate a user-specified image essentially or approximately at a desired location in the initial shape collage or resize the user-specified image from an initial size in the initial collage to a desired size; and
finally processing the command signal and the initial shape collage to create a finished shape collage having either the user-specified image essentially or approximately at the desired location or the user-specified image with the desired size to increase visual appeal of the finished shape collage to the user wherein the step of finally processing includes the step of adjusting size or position of at least one image other than the user's specified image such that images in the finished shape collage are substantially non-overlapping or the borders between images in the finished shape collage are substantially the same.

11. The method as claimed in claim 10, wherein the command signal locates the user-identified image essentially or approximately at the desired location, wherein the user-specified image has an initial location in the initial shape collage and wherein the step of finally processing relocates the user-specified image from the initial location in the initial shape collage.

12. The method as claimed in claim 10, wherein the command signal resizes the user-specified image from the initial size in the initial collage to the desired size and wherein the step of finally processing includes the step of processing the command signal and the user-specified image to create the finished shape collage having the user-specified image with the desired size to increase visual appeal of the finished shape collage to the user.

13. The method as claimed in claim 10, wherein the step of initially processing includes the steps of at least partially covering the at least one desired shape with at least one shape primitive and placing at least one image over the at least one shape primitive to at least partially fill the at least one shape primitive.

14. The method as claimed in claim 13, wherein the step of placing includes the step of adding at least one image that spans multiple shape primitives.

15. The method as claimed in claim 13, wherein a plurality of shape primitives at least partially cover the at least one shape and wherein the shape primitives are rectangular shape primitives.

16. A system for creating a shape collage, the system comprising:
means for receiving a shape specification signal which specifies at least one desired non-rectangular shape having a shape area and a shape outline;
means for receiving image data which represents a plurality of images; and
a processor for processing the shape specification signal and the image data to obtain a shape collage of the images at least partially covering the area of the at least one desired shape, wherein the processor creates a covering based on the shape specification signal, the covering including a plurality of shape primitives, each of the shape primitives having a position which is specified so that it automatically covers a portion of the shape area according to a chosen covering option without the need for human input or intervention, the chosen covering option being one of:
(1) completely covering the shape area and minimizing area covered outside the shape outline;
(2) partially covering the shape area and area outside the shape outline; and
(3) maximizing coverage of the shape area without covering any area outside of the shape outline; and
wherein the processor places at least one image over the shape primitives to at least partially fill each of the shape primitives.

17. The system as claimed in claim 16, wherein the processor adds at least one image that spans multiple shape primitives.

18. The system as claimed in claim 16, wherein a plurality of shape primitives at least partially cover the at least one shape and wherein the shape primitives are rectangular shape primitives.

19. A system for creating a shape collage, the system comprising:
means for receiving a shape specification signal which specifies at least one desired non-rectangular shape having a shape area and a shape outline;
means for receiving image data which represents a plurality of images;
a processor for processing the shape specification signal and the image data to obtain an initial shape collage of the images at least partially covering the area of the at least one desired shape wherein the processor creates a covering based on the shape specification signal, the covering including a plurality of shape primitives, each of the shape primitives having a position which is specified so that it automatically covers a portion of the shape area according to a chosen covering option without the need for human input or intervention, the chosen covering option being one of:
(1) completely covering the shape area and minimizing area covered outside the shape outline;
(2) partially covering the shape area and area outside the shape outline; and
(3) maximizing coverage of the shape area without covering any area outside of the shape outline; and
wherein the processor places at least one image over the shape primitives to at least partially fill each of the shape primitives; and
means for receiving a command signal to either locate a user-specified image essentially or approximately at a desired location in the initial shape collage or resize the user-specified image from an initial size in the initial collage to a desired size; the processor finally processing the command signal and the initial shape collage to create a finished shape collage having either the user-specified image essentially or approximately at the desired location or the user-specified image with the desired size to increase visual appeal of the finished shape collage to the user, the processor adjusting size or position of at least one image other than the user-specified image such that images in the finished shape collage are substantially non-overlapping or the borders between images in the finished shape collage are substantially the same.

20. The system as claimed in claim 19, wherein the command signal locates the user-identified image essentially or approximately at the desired location, wherein the user-specified image has an initial location in the initial shape collage and wherein the processor relocates the user-specified image from the initial location to the desired location in the initial shape collage.

21. The system as claimed in claim 19 wherein the command signal resizes the user-specified image from the initial size in the initial collage to the desired size and wherein the processor processes the command signal and the user-specified image to create the finished shape collage having the user-specified image with the desired size to increase visual appeal of the finished shape collage to the user.

22. A computer-readable non-transitory storage medium that stores a set of instructions including instructions which, when executed by one or more processors, cause the one or more processors to perform the steps comprising:
receiving a shape specification signal which specifies at least one desired non-rectangular shape having a shape area and a shape outline;
receiving image data which represents a plurality of images; and
processing the shape specification signal and the image data to obtain a shape collage of the images at least partially covering the shape area of the at least one desired shape, wherein the step of processing includes the steps of creating a covering based on the shape specification signal, the covering including a plurality of shape primitives, each of the shape primitives having a position which is specified so that it automatically covers a portion of the shape area according to a chosen covering option without the need for human input or intervention, the chosen covering option being one of:
(1) completely covering the shape area and minimizing area covered outside the shape outline;
(2) partially covering the shape area and area outside the shape outline; and
(3) maximizing coverage of the shape area without covering any area outside of the shape outline; and
placing at least one image over the shape primitives to at least partially fill each of the shape primitives.

23. The medium as claimed in claim 22, wherein the step of placing includes the step of adding at least one image that spans multiple shape primitives.

24. The medium as claimed in claim 22, wherein a plurality of shape primitives at least partially cover the at least one shape and wherein the shape primitives are rectangular shape primitives.

25. A computer-readable non-transitory storage medium that stores a set of instructions including instructions which, when executed by one or more processors, cause the one or more processors to perform the steps comprising:
receiving a shape specification signal which specifies at least one desired non-rectangular shape having a shape area and a shape outline;
receiving image data which represents a plurality of images;
initially processing the shape specification signal and the image data to obtain an initial shape collage of the images at least partially covering the area of the at least one desired shape wherein the step of initially processing includes the steps of creating a covering based on the shape specification signal, the covering including a plurality of shape primitives, each of the shape primitives having a position which is specified so that it automatically covers a portion of the shape area according to a chosen covering option without the need for human input or intervention, the chosen covering option being one of:
(1) completely covering the shape area and minimizing area covered outside the shape outline;
(2) partially covering the shape area and area outside the shape outline; and
(3) maximizing coverage of the shape area without covering any area outside of the shape outline; and placing at least one image over the shape primitives to at least partially fill each of the shape primitives;

receiving a command signal to either locate a user-specified image essentially or approximately at a desired location in the initial shape collage or resize the user-specified image from an initial size in the initial collage to a desired size; and finally processing the command signal and the initial shape collage to create a finished shape collage having either the user-specified image essentially or approximately at the desired location or the user-specified image with the desired size to increase visual appeal of the finished shape collage to the user wherein the step of finally processing includes the step of adjusting size or position of at least one image other than the user-specified image such that images in the finished shape collage are substantially non-overlapping or the borders between images in the finished shape collage are substantially the same.

26. The medium as claimed in claim 25, wherein the one or more processors receives the command signal to locate the user-identified image essentially or approximately at the desired location, wherein the user-specified image has an initial location in the initial shape collage and wherein the step of finally processing relocates the user-specified image from the initial location in the initial shape collage.

27. The medium as claimed in claim 25 wherein the one or more processors receives the command signal to resize the user-specified image from an initial size in the initial collage to a desired size and wherein the step of finally processing includes the step of processing the command signal and the user-specified image to create the finished shape collage having the user-specified image with the desired.

* * * * *

UNITED STATES PATENT AND TRADEMARK OFFICE
CERTIFICATE OF CORRECTION

PATENT NO. : 8,976,198 B2  Page 1 of 1
APPLICATION NO. : 12/909452
DATED : March 10, 2015
INVENTOR(S) : Kevin R. Borders et al.

It is certified that error appears in the above-identified patent and that said Letters Patent is hereby corrected as shown below:

IN THE CLAIMS

Column 20, Line 21, Claim 27:

After "user-specified image with the desired"
Insert -- size to increase visual appeal of the finished shape collage to the user --.

Signed and Sealed this
Second Day of February, 2016

Michelle K. Lee
*Director of the United States Patent and Trademark Office*